United States Patent [19]

Steinbach

[11] 3,757,974
[45] Sept. 11, 1973

[54] PIPE CONVEYOR APPARATUS
[75] Inventor: Heinz Steinbach, Reutlingen, Germany
[73] Assignee: Institut Dr. Forster, Reutlingen, Germany
[22] Filed: May 25, 1972
[21] Appl. No.: 256,703

[52] U.S. Cl.................................. 214/339, 74/198
[51] Int. Cl............................................ B65h 51/26
[58] Field of Search........................... 214/338, 339; 198/127 R; 74/198

[56] References Cited
UNITED STATES PATENTS
3,074,605   1/1963   Shaw............................... 214/339 X
3,643,788   2/1972   Werntz............................ 198/127 R
445,293   1/1891   Treat............................... 198/127 R Primary Examiner—Richard E. Aegerter
Assistant Examiner—Douglas D. Watts
Attorney—George J. Netter et al.

[57] ABSTRACT

A pair of conveyor support frames which can be easily assembled and disassembled are provided for temporary connection to the entrance and exit ends, respectively, of a transportable test station. A plurality of individual pipe drive units are mounted on the upper frame reaches for guiding and driving the pipe lengthwise through the test station. Each drive unit includes a pair of rubber-tired wheels rotatably mounted in spaced, edge-opposed relation. Rotative power is furnished from a single shaft extending through both frames via a plurality of special friction drive members which individually engage the rubber-tired wheels. Common adjustment means interconnecting the drive units enable varying the attack angle of all the drive wheels as a unit and to the same amount.

8 Claims, 4 Drawing Figures

Patented Sept. 11, 1973
3,757,974
2 Sheets-Sheet 1
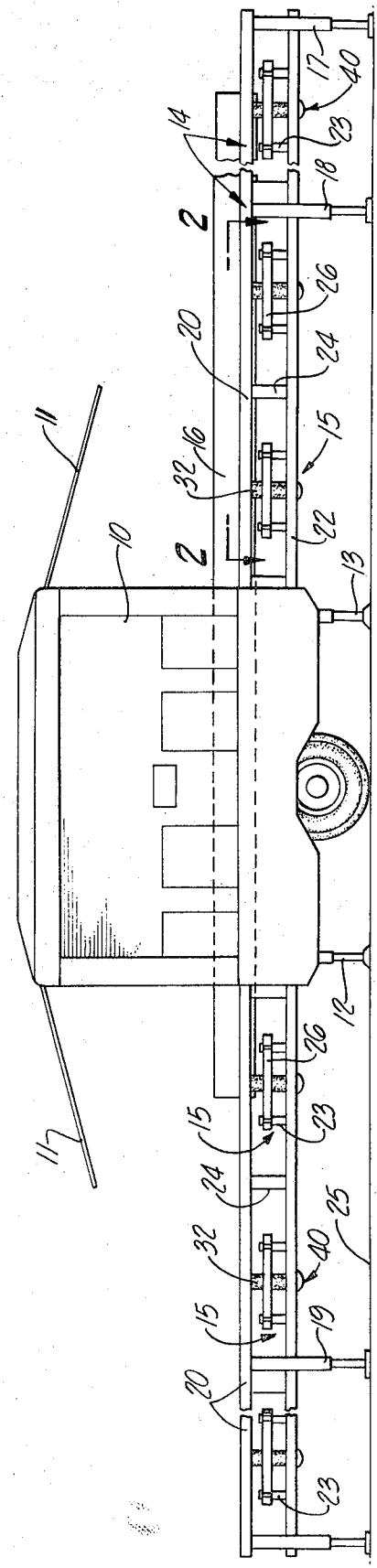
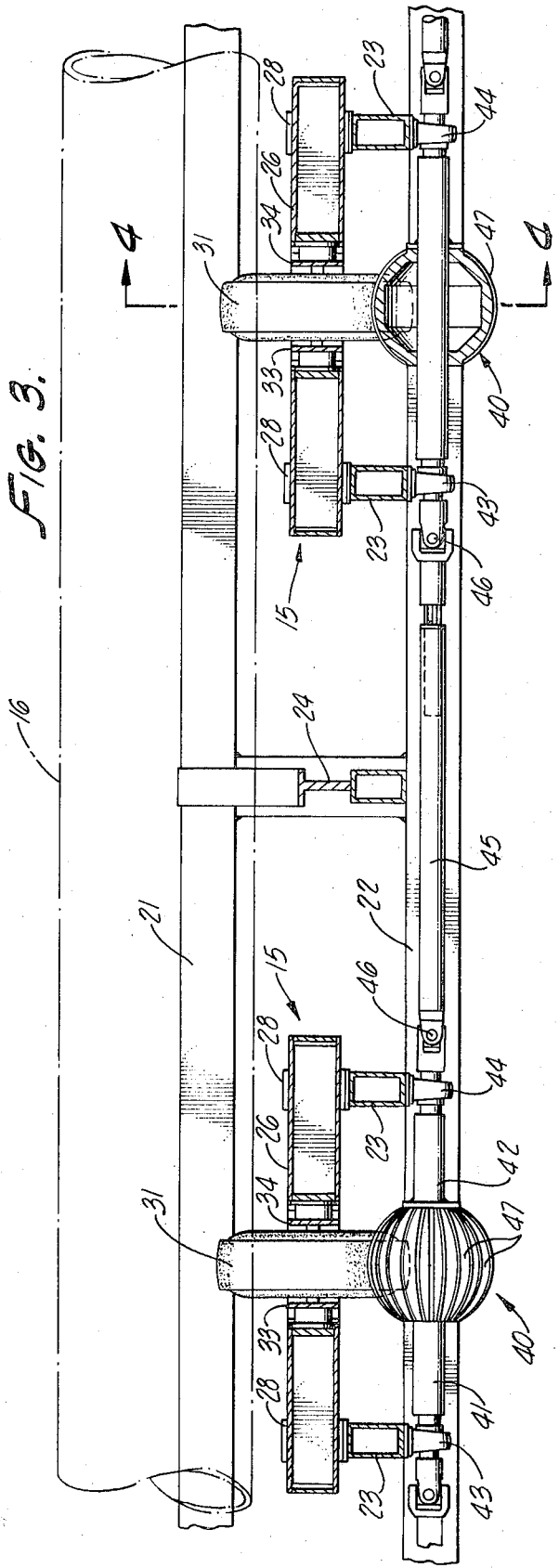

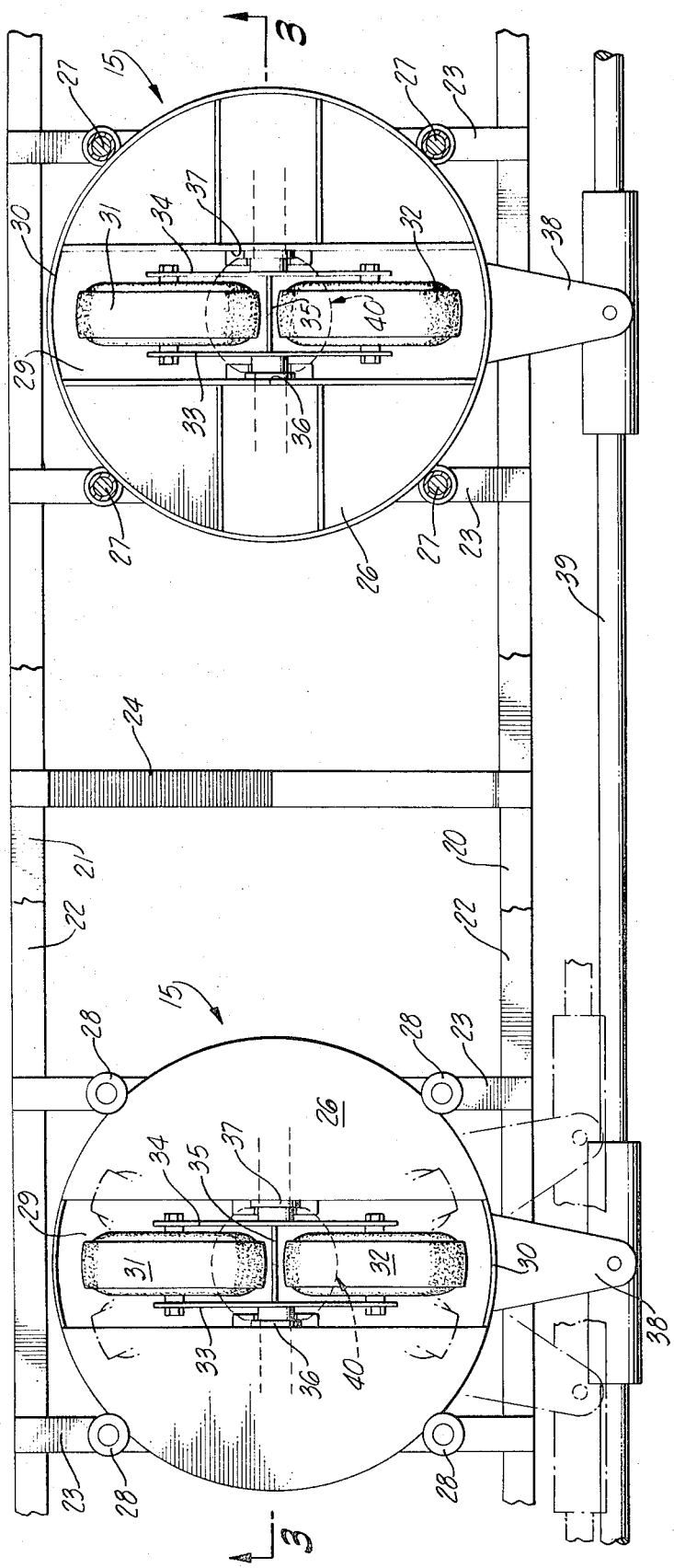
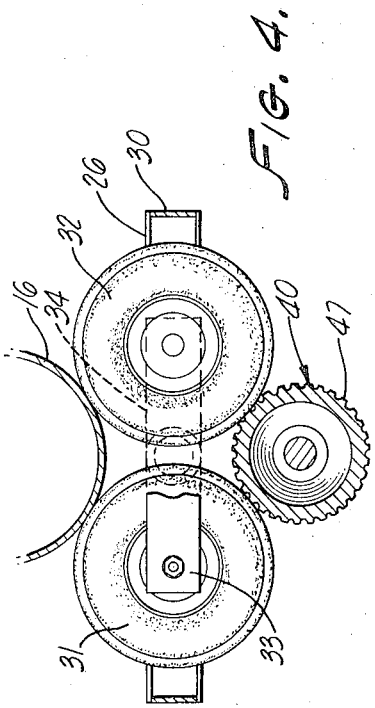

PIPE CONVEYOR APPARATUS

The present invention pertains generally to conveyor apparatus and, more particularly, to conveyor apparatus for driving lengths of pipe or tubing longitudinally through one or more test stations, which apparatus can be readily assembled and disassembled for transportation to and use at different field sites.

BACKGROUND OF THE INVENTION

There are many situations in which it is necessary or desirable to convey lengths of pipe or tubing along a generally longitudinal path during handling. For example, in testing of metal pipe for defects such as cracks or the like, the test pieces are moved longitudinally through test stations where they are examined by known magnetic techniques for the determination of the kind and extent of fractures or physical imperfections in the pipe wall. See, for example, U. S. Pat. No. 3,528,003, SENSOR FOR INSPECTING A TEST PIECE FOR INSIDE AND OUTSIDE FLAWS UTILIZING MEANS RESPONSIVE TO THE TYPE OF FLAW FOR ADJUSTING THE THRESHOLD OF THE SENSOR by F. M. O. Forster, pertaining to the non-destructive testing of pipes and tubes.

Where the pipes or tubes are of extended length, the conveyor drive apparatus must be able to accommodate a certain amount of longitudinal deformation without binding or putting an undue amount of stress on the workpieces and yet still drive them along the path of movement at a relatively constant speed. This is particularly difficult in many cases, such as the testing of oil well casings on site for example, where the conveying apparatus must be relatively easily dismantled, set up for use and transported to a new testing location.

OBJECTS AND SUMMARY OF THE INVENTION

It is, therefore, a primary aim and object of the invention to provide improved conveying apparatus for moving extended pipe lengths along a longitudinal path while rotating them at the same time about their longitudinal axes.

A further object is the provision of pipe conveying apparatus which can be readily assembled and disassembled for on site use.

Another object is the provision of pipe conveying apparatus as in the above objects having a plurality of pipe engaging drive elements which are adjustable as a unit.

Yet another object is the provision of pipe conveying apparatus as above having a frictional universal drive means which engages the drive elements uniformly throughout the full range of adjustment.

In accordance with the practice of this invention a pair of conveyor support frames which can be easily assembled and disassembled are provided for temporary connection to the entrance and exit ends, respectively, of a transportable test station. A plurality of individual pipe drive units are mounted on the upper frame reaches for guiding and driving the pipe lengthwise through the test station. Each drive unit includes a pair of rubber-tired wheels rotatably mounted in spaced, edge-opposed relation. Rotative power is furnished from a single shaft extending through both frames via a plurality of special friction drive members which individually engage the rubber-tired wheels. Common adjustment means interconnecting the drive units enable varying the attack angle of all the drive wheels as a unit and to the same amount.

DESCRIPTION OF THE DRAWINGS

FIG. 1 is a side elevational view of a test vehicle and the conveyor drive apparatus of this invention, shown associated therewith.

FIG. 2 is an enlarged plan, sectional view of the conveyor apparatus of FIG. 1 taken along line 2—2.

FIG. 3 is a sectional, side elevational view taken along line 3—3 of FIG. 2.

FIG. 4 is a sectional, partially fragmentary view taken along line 4—4 of FIG. 3.

DESCRIPTION OF A PREFERRED EMBODIMENT

Turning now to the drawings, and particularly FIG. 1, there is shown a wheeled vehicle 10 which includes testing or other treating apparatus for pipes or tubes which are to be conveyed therethrough by the apparatus to be described below. More particularly, it is contemplated that the vehicle 10 shall preferably include magnetic testing equipment for the determination of the type and extent of faults such as cracks or other dimensional or physical imperfections in metal tubing or pipes. Access doors 11 when open allow for passage of the pipes or tubes to be tested. Adjustable jacks 12 and 13 secure the vehicle 10 in any desired horizontal disposition relative to ground plane.

The conveying apparatus 14 of the invention is seen to comprise generally a plurality of individual pipe positioning and driving means 15 supported on a frame in a spaced, generally straight line extending for a certain distance up to the entrance side of the vehicle 10, through the vehicle and then for some distance beyond the exit side of the vehicle. In a way that will be described more particularly herein, the different driving means 15 will move a tube or pipe 16 lengthwise along the conveyor apparatus up to and through the vehicle 10, while at the same time turning the pipe about its longitudinal axis to impart a helical motion to the pipe or tube. As disclosed in the prior referenced patent, the purpose of this combination motion of the workpiece is to permit defect testing scanning means to examine the entire peripheral area of the pipe as it passes through the test station. A plurality of further jacks 17-19 provide the requisite adjustable support of the frame at spaced intervals for maintaining the various driving means 15 at a suitable, predetermined horizontal condition.

As can be seen best by comparison of FIGS. 1 and 2, the support frame assembly for the conveyor apparatus 14 includes a pair of upper longitudinally extending members 20 and 21 constructed of, for example, channel iron, and a further pair of similar members 22 located below the corresponding members 20 and 21 and spaced therefrom with a plurality of transverse braces 23 and 24 interconnecting the members into an integral construction. As already noted, the jacks 17-19 adjustably support the entire frame assembly and driving means 15 at a height from the ground 25 that is convenient for the handling of pipe as well as enabling compensation for ground irregularities. When satisfactorily assembled and adjusted, the upper members 20 and 21 lie in substantially a single plane and, in the usual case, generally horizontal, although it is to be understood that some variation from horizontal is to be expected due to irregular ground conditions at an on site use, for example, in an oil field.

With reference now particularly to FIG. 2, it is seen that each pipe positioning and drive means 15 includes a cylindrical turntable 26 restingly supported on the upper surface of a pair of adjacent crossbraces 23 interconnecting the upper members 20 and 21. Locating of the turntable on the upper surface of the braces 23 is accomplished by four stanchions 27 extending upwardly from the braces and in edge contacting relation with the turntable periphery. Threaded head means 28 on the upper end of each stanchion can be adjusted into clamping engagement with the upper surface of the turntable, thereby maintaining the turntable against rotative displacement from a predetermined adjustment. That is, the turntable 26, for a purpose that will be more particularly described later herein, may be positioned about its central axis a certain angular extent either clockwise or counterclockwise by merely releasing the adjustable heads 28 and turning the turntable in the desired direction, and, then, on tightening the heads 28, the turntable is secured into its new position of adjustment.

As can be seen on comparison of FIGS. 2 and 3, the turntable is generally circular and includes left and right substantially identical parts separated by a space 29 within which driving members to be described are located. Or, as shown in FIG. 3, the left and right turntable parts are hollow and are secured together by a circumferential rim 30 which bridges the space 29 lying between the parts.

A pair of conventional rubber-tired wheels 31 and 32 are rotatably mounted between a pair of spaced elongated support plates 33 and 34 at the respective ends thereof, the dimensions of which plates are such as to permit individual rotation of the wheels 31 and 32 without contacting each other. At the central part of plates 33 and 34 between the wheels there is provided an axle 35 extending therethrough parallel to the axes of rotation of the wheels and which is journaled in the turntable side walls as at 36 and 37. Accordingly, it is seen that the wheels 31 and 32 are individually rotatable on their respective axles and the entire assembly of wheels and plates 33 and 34 is rotatable about the axis 35 a limited extent.

Extending from a common side of each turntable and generally collinear with the space 29 long dimension is a lever arm 38 which is affixed to the turntable. The lever arm outer end is rotatably secured to a positioning rod means 39 which is shiftable along its longitudinal axis to rotate the turntables (when the head means 28 are loosened) of the different drive means 15 as a common unit and for substantially the same angular extent.

With reference now to FIGS. 3 and 4, it is seen that power to each driving means 15 is transmitted by frictional engagement of the lower periphery of the rubber-tired wheels with a specially shaped rotating drive roller 40. More particularly, the rollers 40 are, overall, generally spheroidal and include axle means 41 and 42 affixed thereto and journaled to cross braces 23 which support the turntable as at 43 and 44. The axle ends are provided with a yoke for interrelation with a similar yoke on the end of a connecting rod 45 to form a conventional universal joint 46. The other end of the connecting rod is similarly related to an axle end of a further drive means 15. In this manner, all of the drive means 15 are connected in common with a source of rotative power (not shown). It is also to be noted that by virtue of the universal connection technique a considerable variation in orientation of the different drive means, both vertically and horizontally, can be tolerated and still obtain effective power transmission.

The drive rollers 40 include a plurality of external ridgelike projections 47 extending circumferentially thereof and coplanar with the axle means 41 and 42. Accordingly, a convoluted outer surface is formed on the rollers which provides a relatively high frictional engagement with the rubber-tired wheel. The spheroidal roller construction establishes a firm contact between the roller and associated rubber-tired wheels throughout the full range of turntable adjustment.

It is to be noted that no special biasing means is provided for connecting the rubber-tired wheels to the driving rollers 40. As described, the wheels are mounted at the ends of a double-forked arrangement, which, in turn, is rotatably mounted on the turntable 26. When the conveyor is unloaded, the different wheels are free-running. As a result of this unbiased frictional wheel drive, tire wear is kept to a minimum and driving power is accordingly minimal. It is also believed that the relatively quiet operation experienced, even when thickened pipe end pieces are being conveyed, is a result of the fact that the wheel tires can deform both at the point of pipe engagement as well as at the point of driving contact with rollers 40.

Due to the ready adjustability of the turntables 26 all at the same time, reversability of pipe drive is quickly and easily obtained, if desired.

There is provided in accordance with the present invention apparatus for imparting longitudinal and rotational motion to pipe, tubings, casings, drill-pipe or the like, which may not be uniformly round, may be curved along their length, or may include sockets or other features at their ends which are larger than pipe diameter and frequently of irregular shape. The described apparatus has no restriction on use occasioned by ambient temperature.

What is claimed is:

1. Conveyor apparatus for moving pipe along a longitudinal path and at the same time rotating it about its longitudinal axis, comprising:
   a frame;
   a plurality of drive units mounted on said frame in a sequence defining a conveyance path, each of said units including,
      flat table means adjustably mounted on said frame, and
      a pair of rubber-tired wheels rotatably mounted on said table means in spaced edge opposed relation for receiving the pipe therebetween and in peripheral contacting relation with said wheels;
   drive shaft means carried by said frame connected with a source of rotative power;
   a plurality of generally spheroidal members mounted to rotate with said drive shaft means, each member being located to engage both wheels of a given drive unit and rotate the same, and
   means for adjusting the angular relation of said table means relative to said pipe.

2. Conveyor apparatus as in claim 1, in which the outer surface of each spheroidal member includes a plurality of projecting ribs which contact the rubber-tired wheels for driving the same.

3. Conveyor apparatus as in claim 1, in which threaded members releasably secure said table means to said frame in predetermined orientation.

4. Conveyor apparatus as in claim 1 in which each of said spheroidal members includes first and second shafts integral therewith and extending axially from opposite sides of said member, and said drive shaft means includes a plurality of connecting rods sequentially interconnecting with the spheroidal member shafts via universal journal means.

5. Conveyor apparatus as in claim 1, in which a plurality of adjustable jack means are affixed to the frame for supporting the same at preselected heights relative to a ground plane.

6. Conveyor apparatus as in claim 1, in which the means for adjusting the table means includes a lever arm attached to said table means and extending transversely of said path in a common direction, and further means are provided interconnected with each lever arm for adjusting all said table means as a unit.

7. Conveyor apparatus for moving pipe along a longitudinal path while simultaneously rotating it about its longitudinal axis, comprising:
a support frame;
a plurality of drive units mounted on said frame in a spaced sequence defining a conveyance path, each of said units including,
table means adjustably mounted on said frame,
a pair of rubber-tired wheels rotatably mounted on said table means in spaced edge opposed relation with said wheel space opening upwardly for receiving the pipe therewithin, which pipe is also in contacting relation with said wheels, and
means for adjusting said table means to effect a given angular relation of said wheels with respect to said pipe;
drive shaft means carried by said frame connected with a source of rotative power; and
a plurality of friction members flexibly interconnected with said drive shaft means, each member being located to engage both wheels of a given drive unit and rotate the same.

8. Conveyor apparatus for moving pipe along a longitudinal path while simultaneously rotating it about its longitudinal axis, comprising:
a support frame,
a plurality of drive units mounted on said frame in a spaced sequence defining a conveyance path, each of said units including,
table means adjustably mounted on said frame,
a pair of rubber-tired wheels rotatably mounted on said table means in spaced edge opposed relation with said wheel space opening upwardly for receiving the pipe therewithin, which pipe is also in contacting relation with said wheels, and
a lever arm attached to said table means and extending transversely of said path in a common direction for adjusting said table means;
drive shaft means carried by said frame connected with a source of rotative power;
a plurality of friction members flexibly interconnected with said drive shaft means, each member being located to engage both wheels of a given drive unit and rotate the same; and
means interconnecting with each lever arm for adjusting said lever arms and said associated table means as a unit.

* * * * *